United States Patent
Moon et al.

(10) Patent No.: US 10,702,358 B2
(45) Date of Patent: Jul. 7, 2020

(54) DENTAL NOZZLE TIP INCLUDING EXPANDED TYPE OPENING

(71) Applicant: Hyeong Joo Moon, Gimpo-si, Gyeonggi-do (KR)

(72) Inventors: Hyeong Joo Moon, Gimpo-si (KR); Cho Eun Moon, Gimpo-si (KR); Chae Eun Moon, Gimpo-si (KR)

(73) Assignee: Hyeong Joo Moon, Gimpo-si, Gyeonggi-Do (KR)

( * ) Notice: Subject to any disclaimer, the term of this patent is extended or adjusted under 35 U.S.C. 154(b) by 0 days.

(21) Appl. No.: 16/048,829

(22) Filed: Jul. 30, 2018

(65) Prior Publication Data

US 2019/0247161 A1 Aug. 15, 2019

(30) Foreign Application Priority Data

Feb. 14, 2018 (KR) .................. 10-2018-0018500

(51) Int. Cl.
*A61C 9/00* (2006.01)
*A61C 5/64* (2017.01)

(52) U.S. Cl.
CPC .............. *A61C 9/0026* (2013.01); *A61C 5/64* (2017.02)

(58) Field of Classification Search
CPC .............................. A61C 9/0026; A61C 5/64
USPC ..................... 433/80; 222/566–574; 401/288
See application file for complete search history.

(56) References Cited

U.S. PATENT DOCUMENTS

| | | | | |
|---|---|---|---|---|
| 1,312,347 | A * | 8/1919 | Ogden | A46B 11/08 401/2 |
| 3,722,097 | A | 3/1973 | Colman et al. | |
| 4,682,950 | A * | 7/1987 | Dragan | A61C 5/62 222/575 |
| 4,768,954 | A * | 9/1988 | Dragan | A47B 67/005 222/575 |
| 4,995,540 | A * | 2/1991 | Colin | A61C 9/0026 222/132 |
| 5,244,388 | A * | 9/1993 | Frush | A61C 9/00 222/575 |
| 6,786,724 | B1 * | 9/2004 | Kwong | A61C 9/0026 222/575 |
| 2004/0142301 | A1 | 7/2004 | Maissami | |
| 2009/0218374 | A1 * | 9/2009 | Liberatore | B05C 17/00506 222/566 |
| 2011/0027753 | A1 | 2/2011 | Maurat et al. | |
| 2012/0134738 | A1 * | 5/2012 | Habibi-Naini | A46B 11/00 401/288 |
| 2016/0256210 | A1 * | 9/2016 | Dupuy | A61B 17/8816 |

FOREIGN PATENT DOCUMENTS

| | | |
|---|---|---|
| JP | 2001112783 A | 4/2001 |
| JP | 2007126462 A | 5/2007 |
| JP | 2015-033519 A | 2/2015 |
| KR | 10-2015-0018421 A | 2/2015 |

* cited by examiner

*Primary Examiner* — Sean M Michalski
*Assistant Examiner* — Miryada A Aponte
(74) *Attorney, Agent, or Firm* — Novick, Kim & Lee, PLLC; Jae Youn Kim

(57) ABSTRACT

Disclosed is a dental nozzle tip used to apply a dental impression material, the dental nozzle tip including an impression material inlet and an impression material outlet connected to the impression material inlet, wherein the impression material outlet is configured to have an expanded type opening at a tail end opposite to an end connected to the impression material inlet.

11 Claims, 6 Drawing Sheets

DENTAL NOZZLE TIP INCLUDING EXPANDED TYPE OPENING

CROSS-REFERENCE TO RELATED APPLICATION(S)

This application claims the priority benefit of Korean Patent Application No. 10-2018-0018500 filed on Feb. 14, 2018, in the Korean Intellectual Property Office, the disclosure of which is incorporated herein by reference for all purposes.

BACKGROUND

1. Field

One or more example embodiments relate to a dental nozzle tip used to apply an impression material.

2. Description of Related Art

In general, impression materials may be materials used to imprint shapes of teeth and an abutment for dental treatment. Elastic impression materials may include, for example, alginic acid colloid, Thiokol, a rubber base, and a silicone rubber base. Inelastic impression materials may include, for example, a modeling compound and zinc eugenol. Various materials are selected and used based on purposes of the impression materials.

The impression material and a hardener may be stored in a pair of cartridges, respectively and discharged while being mixed with each other by a mixing tip. The mixing tip may include a nozzle to discharge the impression material. The present disclosure relates to a nozzle tip attached to the nozzle to discharge the impression material.

In terms of the mixing tip, some techniques have been disclosed for, for example, devices that effectively mix impression materials and hardeners in a related field.

However, there has been little or no research on a method of effectively applying an impression material to a tooth and a nozzle tip for implementing the method, and an application device including the nozzle tip. Also, there is no widely known nozzle tip for ejecting an impression material to effectively apply a proper amount of impression material to a tooth, which may prevent a waste of material, and imprint a pattern of teeth with a minimal error. Accordingly, there is a desire for research on a device for effectively applying an impression material and an application method using the device.

SUMMARY

An aspect provides a dental nozzle tip that evenly applies a proper amount of impression materials onto a tooth to accurately imprint a shape of the tooth while preventing a waste of materials using a simple tool to solve the aforementioned issues. Specifically, the dental nozzle tip may uniformly and relatively thinly apply bite registration materials that are used in a process of finding an accurate occlusion point.

However, tasks of the present disclosure are not limited to those mentioned above, and other matters not mentioned can be clearly understood by those skilled in the art from the following description.

According to an aspect, there is provided a dental nozzle tip for an impression material, the dental nozzle tip including an impression material inlet and an impression material outlet connected to the impression material inlet, wherein the impression material outlet is configured to have an expanded type opening at a tail end opposite to an end connected to the impression material inlet.

The tail end with the expanded type opening may have a width greater than a height.

A width of the tail end with the expanded type opening may be 5 millimeters (mm) to 13 mm.

A height of the tail end with the expanded type opening may be 4 mm to 5.5 mm.

At least a portion of a lower face of the impression material outlet may be cut in a direction from the expanded type opening toward the impression material inlet so as to be open.

The lower face of the impression material outlet may be cut by 1 mm to 2.5 mm from a virtual straight end line of the impression material inlet so as to be open.

A shape of a cut surface of the lower face of the impression material outlet may be concavely rounded toward the impression material inlet.

In a cross section of the expanded type opening, a portion corresponding to an upper face of the impression material outlet includes a straight section.

The impression material outlet may be bent to make an acute angle with a virtual line extending from the impression material inlet.

The dental nozzle tip may include a transparent material.

The dental nozzle tip may be formed to be integrated or combined with an impression material mixing tip.

A lower face of the dental nozzle tip may include a stepped portion and, in a cross section of the expanded type opening, a portion forming a lower step of the lower face of the impression material outlet may include a straight section.

According to another aspect, there is also provided a dental impression material applying device including the dental nozzle tip and a dental impression material mixing tip including a nozzle.

According to still another aspect, there is also provided a dental impression material applying method of applying an impression material to a tooth using the dental nozzle tip.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. Also, in the description of embodiments, detailed description of well-known related structures or functions will be omitted when it is deemed that such description will cause ambiguous interpretation of the present disclosure. Terminologies used herein are defined to appropriately describe the example embodiments of the present disclosure and thus may be changed depending on a user, the intent of an operator, or a custom. Accordingly, the terminologies must be defined based on the following overall description of this specification.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

A dental nozzle tip for an impression material will be described in detail with reference to example embodiments and the accompanying drawings. It should be understood, however, that there is no intent to limit this disclosure to the particular example embodiments disclosed.

Figure 1:
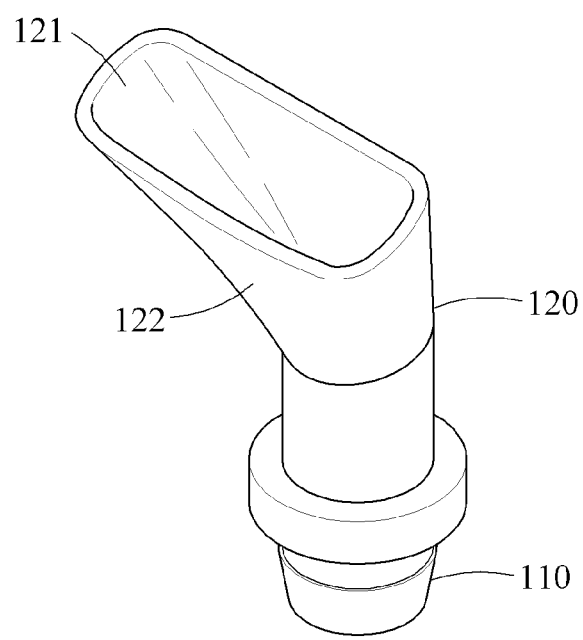
FIG. 1 is a perspective view illustrating a structure of a dental nozzle tip for an impression material according to an example embodiment.

FIG. 1 is a perspective view illustrating a structure of a dental nozzle tip 100 for an impression material according to an example embodiment.

A dental nozzle tip for an impression material may include an impression material inlet 110 and an impression material outlet 120 connected to the impression material inlet 110. The impression material outlet 120 may have an expanded type opening 121 at a tail end opposite to an end connected to the impression material inlet.

The dental nozzle tip 100 may include the impression material inlet 110 having, for example, a columnar structure. The columnar structure of the impression material inlet 110 may be in a shape of, for example, a cylinder, a square column, a pentagonal column, and a hexagonal column.

The impression material outlet 120 may be connected to one end portion of the impression material inlet 110 having the columnar structure. One end of the impression material outlet 120 may be connected to the impression material inlet 110. Also, the impression material outlet 120 may include the expanded type opening 121 in the other end.

For example, the impression material inlet 110 may have a tail end opposite to the end connected to the impression material outlet 120, The tail end may be connected to an impression material mixing tip 200 (see FIG. 5) and the like.

In this example, an impression material mixed with a material such as a hardener may be introduced into the dental nozzle tip 100.

The impression material outlet 120 may be formed to have a cross-sectional area gradually increasing in a direction from a portion connected to the impression material inlet toward the expanded type opening 121.

A cross-sectional area of the expanded type opening 121 may be at least three times greater than a cross-sectional area of the impression material inlet 110.

Figure 2:
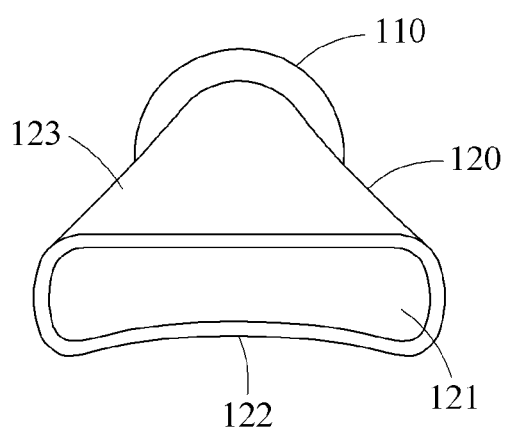
FIG. 2 is a view illustrating a structure of an expanded type opening of a dental nozzle tip for an impression material according to an example embodiment.

FIG. 2 is a view illustrating a structure of an expanded type opening 121 of a dental nozzle tip 100 for an impression material according to an example embodiment. In a cross section of an expanded type opening 121, a tail end of an expanded type opening 121 may have a width greater than a height.

For example, the cross section of the expanded type opening 121 may be in a rectangular shape or an oval shape having a horizontal axis greater in length than a vertical axis.

A width of the tail end of the expanded type opening 121 may be 5 millimeters (mm) to 13 mm. For example, the width of the tail end of the expanded type opening 121 may be 7 mm to 13 mm, or 5 mm to 10 mm. A desired width of the tail end may be slightly greater than a width of a tooth, for example, a molar. Since a size of a tooth varies based on an age, a desired range may be determined based on a width of a target tooth within the aforementioned range.

A height of the tail end of the expanded type opening 121 may be 4.0 mm to 5.5 mm. For example, the height of the tail end of the expanded type opening 121 may be 4.2 mm to 5.5 mm or 4.0 mm to 5.2 mm. The height of the tail end of the expanded type opening 121 may be determined based on a height of the tooth. The height of the tail end of the expanded type opening 121 may be within the aforementioned range to prevent the impression material from flowing unnecessarily when the impression material is discharged, which may lead to a waste of the impression material. Vertical and horizontal lengths of the expanded type opening 121 may be associated with a size of the tooth to which the impression material is applied. The impression material discharged through the expanded type opening 121 may be applied to the tooth, and fixed and hardened such that the tooth is imprinted on the impression material.

When lengths of the longest vertical and horizontal axes of the cross section of the expanded type opening 121 are beyond the range, an excessively large or small amount of the impression material may be discharged at once and thus, an even application may not be performed.

The length of the longest horizontal axis of the expanded type opening 121 may be slightly greater than or equal to a general width of a tooth. A practitioner may evenly apply the impression material to the tooth by discharging the impression material once without repetitive operations.

Figure 3:
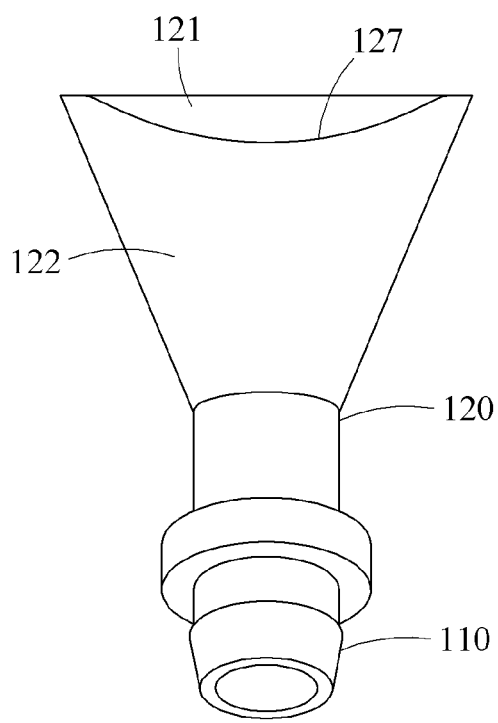
FIG. 3 is a view illustrating a dental nozzle tip having a lower face of which a portion is cut in a direction to an impression material inlet to be open according to an example embodiment.

FIG. 3 is a view illustrating a dental nozzle tip 100 having a lower side 122 of which a portion is cut in a direction to an impression material inlet 110 to be open according to an example embodiment.

A portion of a lower side 122 of an impression material outlet 120 may be cut in a direction from an expanded type opening 121 to the impression material inlet 110 so as to be open. That is, the lower side 122 of the impression material outlet may include a cut surface 127 defined towards the one end of the impression material outlet 120.

When the portion of the lower side 122 of the impression material outlet 120 is cut and open, an impression material may be effectively and evenly discharged toward a tooth above which the dental nozzle tip 100 is positioned.

When a practitioner discharges the impression material while slowly moving an impression material nozzle tip 100 in a direction in which an upper side 123 of the impression material outlet 120 is located, the impression material discharged through an open structure of the impression material outlet 120 may be effectively applied to the tooth. The impression material discharged through a cut area of the lower side 122 may be evenly spread by the upper side that is uncut and relatively extended unlike the lower side 122, which may reduce an amount of impression material used and allows an even application of the impression material.

The lower side 122 of the impression material outlet may be cut by 1 mm to 2.5 mm from a virtual straight end line of the impression material outlet 120 so as to be open.

When a cut portion of the impression material outlet 120 is less than 1 mm from the virtual straight end line, the impression material may be insufficiently discharged toward in a direction in which the lower side 122 is located. When the cut portion is greater than 2.5 mm from the virtual straight end line, an excessively large amount of impression material may be discharged in the direction in which the lower side 122 is located, so that the impression material is unevenly applied to the tooth.

A shape of a cut surface of the lower side 122 of the impression material outlet 120 may be concavely rounded toward the impression material inlet 110.

Through this, a relatively large amount of impression material may be discharged to a central portion of the tooth such that a dental impression may be effectively performed.

In a cross section of the expanded type opening 121, a portion corresponding to the upper side of the impression material outlet may include a straight section.

As shown in the cross section of the expanded type opening 121, the upper side of the impression material outlet 120 may include a straight portion, thereby performing a function to evenly and smoothly spread the impression material discharged through the expanded type opening 121.

Through this, the discharged impression material may be applied to have a flat and even surface such that a shape of the tooth is reflected accurately and a waste of the impression material is prevented.

Figure 4:
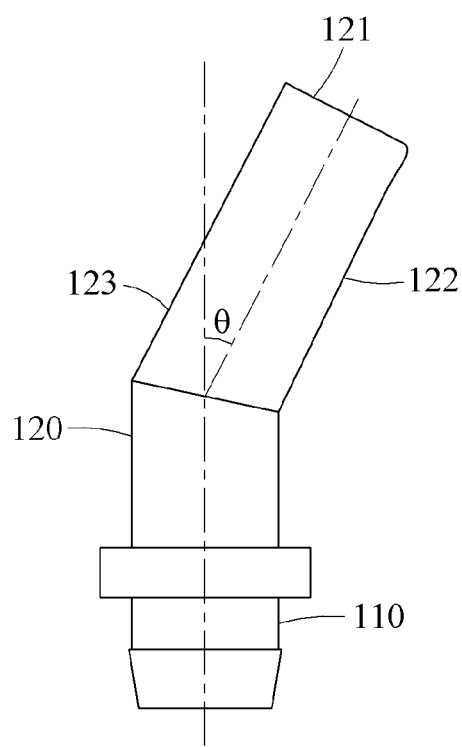
FIG. 4 is a view illustrating a connection structure between an impression material inlet and an impression material outlet of a dental nozzle tip for an impression material according to an example embodiment.

FIG. 4 is a view illustrating a connection structure between an impression material inlet 110 and an impression material outlet 120 of a dental nozzle tip 100 for an impression material according to an example embodiment.

An impression material outlet 120 may be bent to make an acute angle θ with a virtual line extending from an impression material inlet 110.

By applying a structure in which the impression material outlet 120 is bent and connected to the impression material inlet 110, a practitioner may effectively apply the impression material to the tooth in a relaxed posture without need to fold a wrist by force to perform a dental impression.

The dental nozzle tip 100 may include a transparent material.

For example, the dental nozzle tip 100 may include silicon.

By using the transparent material, the practitioner may visually verify an amount of impression material remaining in the dental nozzle tip 100 and an amount of impression material being discharged through the dental nozzle tip 100 to adjust a dispensing speed while performing the dental impression.

Figure 5:
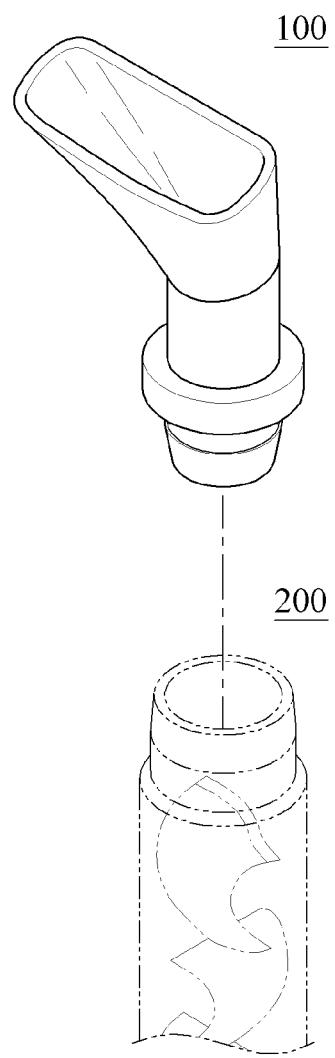
FIG. 5 is a view illustrating a structure in which a dental nozzle tip for an impression material is combined with an impression material mixing tip according to an example embodiment.

FIG. 5 is a view illustrating a structure in which a dental nozzle tip 100 for an impression material is combined with an impression material mixing tip 200 according to an example embodiment.

A dental nozzle tip 100 may be formed to be integrated or combined with an impression material mixing tip 200.

Figure 6:
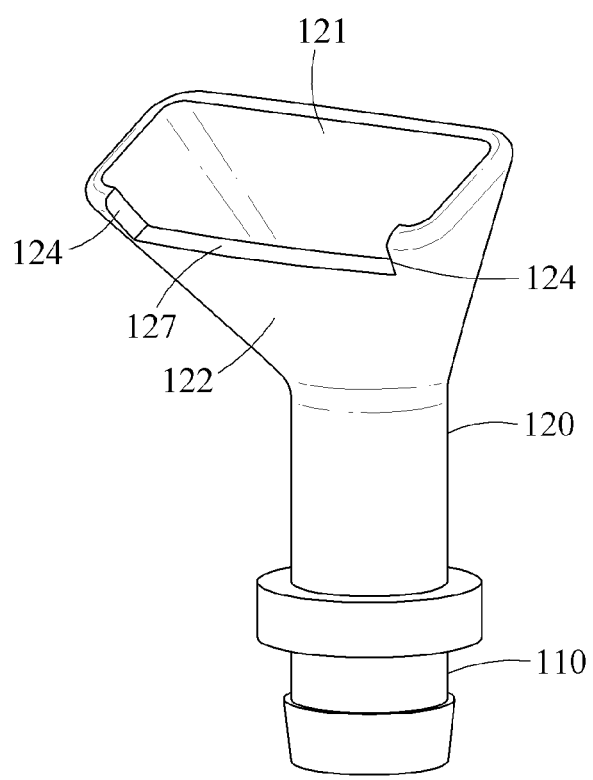
FIG. 6 is a view illustrating a structure of a dental nozzle tip in which a lower face includes a stepped portion and a cross section of an expanded type opening includes a straight section corresponding to a portion forming a lower step of a lower face of an impression material outlet according to an example embodiment.

FIG. 6 is a view illustrating a structure of a dental nozzle tip 100 in which a lower side 122 includes a cut surface 127 having a stepped portion 124 and a cross section of an expanded type opening 121 includes a straight section corresponding to a portion forming a lower step of a lower side of an impression material outlet 120 according to an example embodiment.

A lower side of a dental nozzle tip 100 may include a stepped portion 124. An end shape of a portion forming a lower step of a lower side 122 of an impression material outlet 120 may include a straight section.

The portion forming the lower step may function to effectively discharge an impression material rearwardly when the impression material is applied.

The straight section provided at an end of the portion forming the lower step may be to ensure that a proper amount of impression material is applied to a tooth while the dental nozzle tip 100 moves on the tooth, to form an impression material having an appropriate thickness on the tooth so as to obtain a solid body for effectively verifying a shape of the tooth after the impression material is hardened.

According to an example embodiment, a dental impression material applying device may include the dental nozzle tip and a dental impression material mixing tip including a nozzle.

According to an example embodiment, a dental impression material applying method may be of applying an impression material to a tooth using the dental nozzle tip.

According to example embodiments, it is possible to provide a nozzle tip attached to an end of a nozzle to evenly apply a proper amount of impression material onto a tooth, thereby accurately imprinting a shape of the tooth while preventing a waste of materials.

According to example embodiments, it is possible to provide a dental nozzle tip for an impression material to accurately verify an arrangement of teeth of a patient in order to perform an effective customized dental treatment and reduce a cost of the treatment by reducing an amount of materials used. Specifically, the dental nozzle tip may uniformly and relatively thinly apply bite registration materials that are used in a process of finding an accurate occlusion point.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dental nozzle tip for an impression material, the dental nozzle tip comprising:
    an impression material inlet having one end thereof connected to an impression material outlet having an expanded opening at a distal end thereof opposite to the one end connected to the impression material inlet,
    wherein the expanded opening includes a lower side and an upper side,
    wherein a width of the expanded opening is greater than a height thereof at the distal end and the width of the expanded opening increases towards the distal end, wherein a distal end portion of the lower side includes a cut surface defined towards the one end of the impression material inlet, and the distal end portion of the lower side is disposed lower than a distal end portion of the upper side, such that the cut surface is disposed lower than the distal end portion of the upper side, and wherein the cut surface defined on the lower side of the impression material outlet has a depth of 1 mm to 2.5 mm towards the one end of the impression material inlet from the distal end of the lower side of the expanded opening.

2. The dental nozzle tip of claim 1, wherein the width of the expanded opening at the distal end is 5 millimeters (mm) to 13 mm.

3. The dental nozzle tip of claim 1, wherein the height from the lower side to the upper side of the expanded opening at the distal end is 4 mm to 5.5 mm.

4. The dental nozzle tip of claim 1, wherein, in the expanded opening, a portion corresponding to the upper side of the impression material outlet includes a straight section.

5. The dental nozzle tip of claim 1, wherein the impression material outlet is disposed at an acute angle with respect to a transverse axis of the impression material inlet.

6. The dental nozzle tip of claim 1, wherein the dental nozzle tip includes a transparent material.

7. The dental nozzle tip of claim 1, wherein the dental nozzle tip is integrally or detachably coupled with an impression material mixing tip.

8. The dental nozzle tip of claim 1, wherein the cut surface disposed on the lower side of the dental nozzle tip includes a stepped portion, and wherein, in the expanded opening, a portion forming a lower step of the stepped portion of the impression material outlet includes a straight section.

9. A dental impression material applying device comprising:
   the dental nozzle tip of claim 1; and
   a dental impression material mixing tip including a mixing tip nozzle.

10. A dental impression material applying method of applying an impression material to a tooth, the method comprising using the dental nozzle tip of claim 1.

11. The dental nozzle tip of claim 1, wherein the cut surface is concavely rounded toward the one end of the impression material inlet.

\* \* \* \* \*